United States Patent [19]

Wahl

[11] 3,853,247

[45] Dec. 10, 1974

[54] VIBRATORY BIN ACTIVATOR

[76] Inventor: Eugene A. Wahl, 460 Ridgewood Ave., Glen Ridge, N.J. 07028

[22] Filed: Mar. 8, 1972

[21] Appl. No.: 232,787

[52] U.S. Cl. .............................................. 222/199
[51] Int. Cl. ............................................... B65g 3/12
[58] Field of Search .................... 222/460, 198–203, 222/564, 196; 239/590.5; 259/72; 52/192, 197; 214/17 R; 415/121 G, 183

[56] References Cited
UNITED STATES PATENTS

| 10,979 | 1/1889 | Jewell | 222/199 X |
| 422,623 | 3/1890 | Pilliod | 222/196 |
| 784,463 | 3/1905 | Yancey | 222/201 X |
| 1,271,420 | 7/1918 | Bewan | 222/264 X |
| 1,277,821 | 9/1918 | Baird | 222/564 X |
| 2,378,012 | 6/1945 | Herbster | 415/121 G |
| 2,477,200 | 7/1949 | Penny | 222/564 X |
| 3,146,918 | 9/1964 | Williams | 222/199 |
| 3,232,486 | 2/1966 | Ofner | 222/196 X |
| 3,261,508 | 7/1966 | Wahl | 222/199 |
| 3,479,146 | 11/1969 | Hochman et al. | 239/590.5 X |
| 3,507,480 | 4/1970 | Gabor | 214/17 R |

FOREIGN PATENTS OR APPLICATIONS

| 313,781 | 8/1969 | Sweden | 222/196 |

Primary Examiner—Stanley H. Tollberg
Assistant Examiner—Norman L. Stack, Jr.
Attorney, Agent, or Firm—Rudolph J. Jurick

[57] ABSTRACT

Apparatus for attachment to storage bins or hoppers to promote a positive flow of particulate material therefrom. The apparatus includes means for agitating the material in the hopper and baffle means arranged to draw material from various regions of the hopper.

5 Claims, 4 Drawing Figures

PATENTED DEC 10 1974 3,853,247
SHEET 1 OF 2
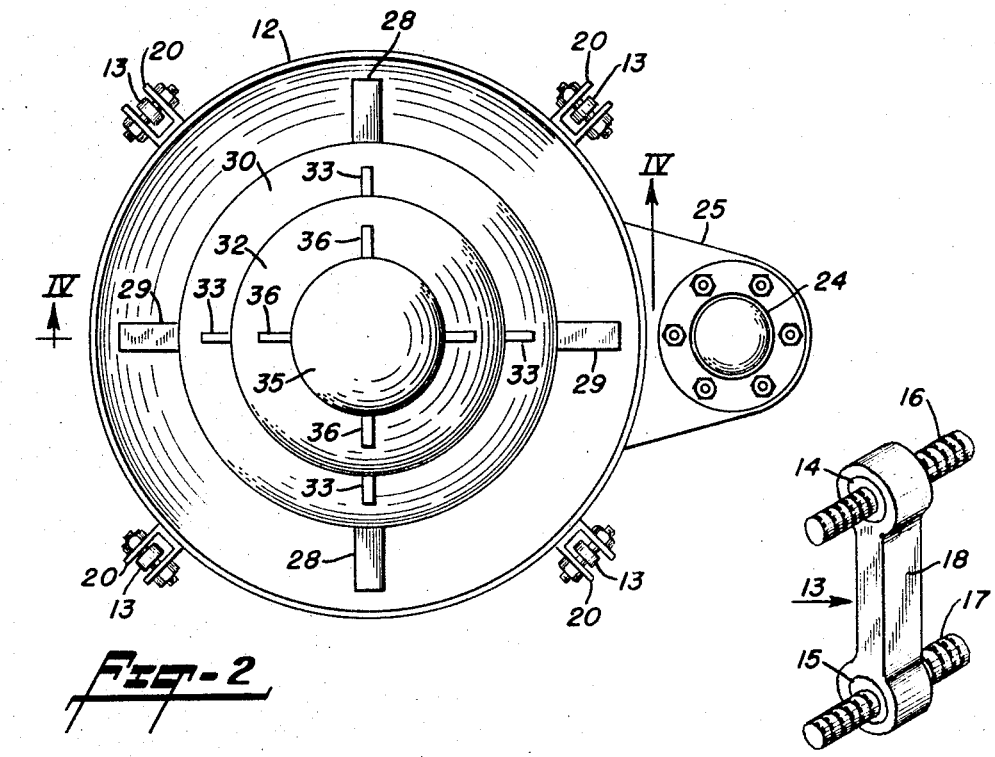
FIG-2
FIG-3
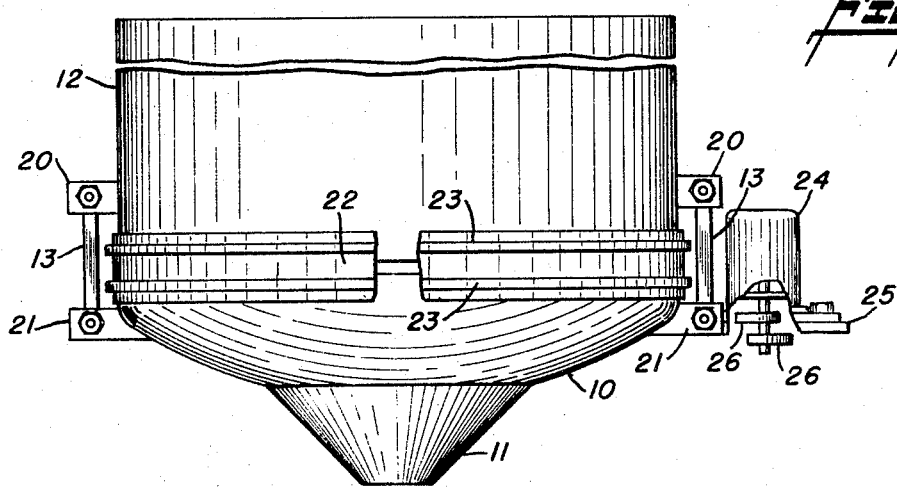
FIG-1

VIBRATORY BIN ACTIVATOR

BACKGROUND OF THE INVENTION

The invention relates to bin activator apparatus adapted for vibratory attachment to the bottom of a storage bin for inducing the flow of powdered, granular or the like materials therefrom. Apparatus of this type is shown in my U.S. Pat. No. 3,261,508 issued July 19, 1966 and entitled Vibratory Bin Activator. It is a known fact that when loading into a storage bin, most materials, consisting of various particle sizes, segregate as to size and may thereafter discharge from the bin with the fine and coarse particles exiting separately rather than as a homogeneous mix. In large bins, wherein the baffle of the bin activator has a diameter of the order of 4 – 8 feet, certain materials may be withdrawn from the bin predominantly from the regions proximate to the bin wall.

In accordance with this invention, the bin activator apparatus includes a plurality of spaced, concentric baffles with material flow paths under each baffle proportioned to draw specific amounts of the material from various regions of the bin.

SUMMARY OF THE INVENTION

The bin activator apparatus comprises a vibratable concave material-receiving member terminating in a discharge opening and carrying a plurality of axially-spaced baffles, each baffle overlying a central opening formed in the underlying baffle. The baffles are mounted on spaced supports to provide a plurality of passages for the flow of material from the bin to concave member.

An object of this invention is the provision of improved bin activator apparatus attachable to a storage bin to promote the discharge of particulate material therefrom.

An object of this invention is the provision of apparatus adapted for use with a storage bin, which apparatus is constructed and arranged to provide a positive, simultaneous discharge of material from various regions of the bin.

An object of this invention is the provision of bin activator apparatus adapted for vibratory attachment to the bottom of a storage bin, which apparatus includes a plurality of axially-spaced baffles supported in such manner as to provide a plurality of generally concentric flow paths for the discharge of material from the bin.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 1 is a side elevational view showing bin activator apparatus made in accordance with this invention and attached to a storage bin;

FIG. 2 is a top plan view thereof;

FIG. 3 is an enlarged isometric view of one of the vibration isolator suspension mountings.

DESCRIPTION OF PREFERRED EMBODIMENT

Figure 4:
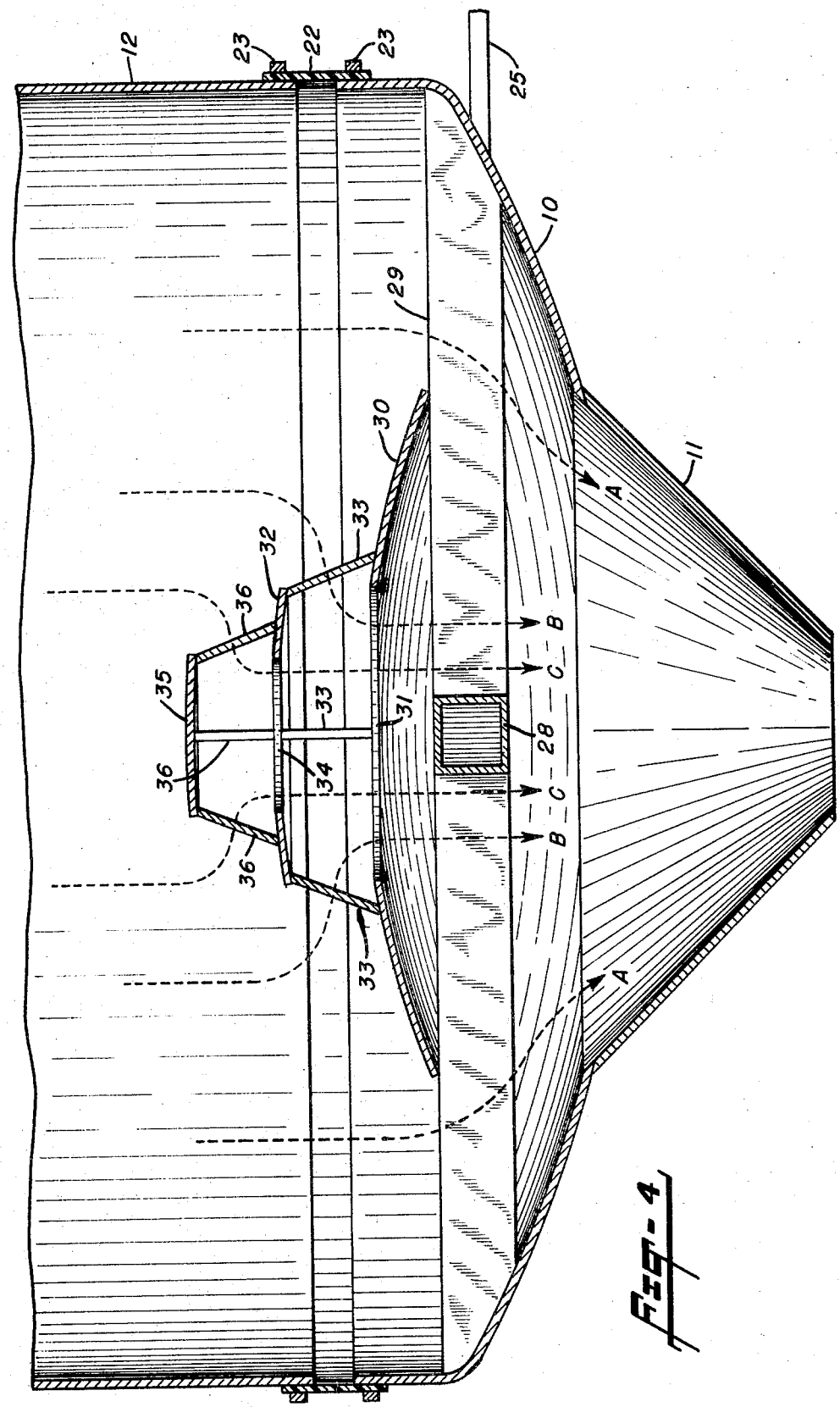
FIG. 4 is an enlarged cross-sectional view taken along the line IV—IV of FIG. 2.

Referring to the drawings, the bin activator apparatus comprises a concave material-receiving member 10 terminating in a conical spout 11 constituting a discharge opening, said concave member being suspended from the bottom of the storage bin 12 by four vibration-isolating, suspension mountings 13. As shown in FIG. 3, these mountings comprise rubber cylinders 14, 15 which are molded to the threaded rods 16, 17 and to the steel link 18, the rubber cylinders having a thickness substantially equal to that of the link. The rods 16 pass through aligned holes formed in the legs of U-shaped brackets 20 welded to the bin, while the rods 17 pass through aligned holes formed in the legs of similar brackets 21 welded to the concave member 10. The suspension mountings are secured in place by nuts threaded onto the rods 16, 17.

The upper end of the conical member 10 is spaced from the open bottom of the bin, and the space between these members is closed by a flexible band 22 secured in place by metal straps 23. An electro-mechanical gyrator 24 is bolted to a rigid bracket 25, said gyrator having eccentrically-mounted weights 26 (FIG. 1) secured to the drive shaft of an electric motor. Upon energization of the gyrator, the weights rotate in a horizontal plane, thereby imparting vigorous vibrations to the concave member 10 and the baffles, which results in the discharge of the material from the bin and the concave member and assures a positive flow of the material out of the spout 11. The speed of rotation of the eccentric weights and the amplitude of the vibrations imparted to the apparatus will vary with the size and character of the particular material in the bin. For example, a gyrator developing a thrust of ⅛ inch at a frequency of 1,800 – 3,000 cycles per minute will effectively discharge materials such as wet sand, clay, wood chips, etc.

Referring now specifically to FIGS. 2 and 4, diametrically-oriented, tubular crossbars 28 and 29 are welded to the material-receiving member 10. An inverted conical or spherical baffle 30 is welded to the crossbars and has a central opening 31 formed therein. A second, inverted conical or spherical baffle 32 is secured in place by the four spaced struts 33 welded to the baffles 30 and 32, said baffle 32 being provided a central opening 34 and overlapping the opening 31 formed in the baffle 30. Similarly, a third baffle 35 is secured in place by the four struts 36 and overlaps the opening in the baffle 32.

The material-receiving member 10, the baffles and their supporting members constitute a rigid structure which vibrates orbitally in a generally horizontal plane upon energization of the gyrator. The vibrations are transmitted by the baffles to the material contained in the bin, whereby the material moves freely out of the bin and into the conical member 10 unhindered by the head load of the material in the bin. Material in the region of the bin wall flows along the path indicated by the arrows A, whereas material in the central region of the bin flows along the path indicated by the arrows C. Material between these two regions flows along the path indicated by the arrows B. Material which falls on the material-receiving member is vibrationally moved out of the discharge spout 11. The outlet area under each baffle can be proportioned to draw specific amounts of the material from the various regions of the bin, thus controlling the re-mixing of material from such regions as it passes out of the spout.

Although a series of three, axially-spaced baffles is shown in the drawings, it will be apparent that only the two baffles 30 and 32 may be used, thereby to provide two paths for the flow of material from two regions of the bin toward the material-receiving member. Regardless of the number of baffles incorporated in a particular bin activator, only the underlying baffles have central openings formed therein, with each baffle preferably extending somewhat beyond the opening formed in the immediately underlying baffle.

Having described the invention what I desire to protect by letters patent is set forth in the following claims.

I claim:

1. Apparatus for promoting the flow of material from a bin having a bottom opening, said apparatus comprising,
   a. a concave material-receiving member terminating in a discharge opening and positioned to receive material from the bin, said member having an inlet opening corresponding to the bottom opening of the bin,
   b. a first inverted conical baffle secured to the material-receiving member and having a central opening formed therein, the peripheral surface of said baffle being spaced from the inner wall of the material-receiving member,
   c. a second inverted conical baffle secured to and axially spaced from the said first baffle, said second baffle having a diameter smaller than that of said first baffle and being positioned above the inlet opening of the material recieving member,
   d. means for vibrating the material-receiving member, and means suspending the material-receiving member from the bin.

2. The invention as recited in claim 1, wherein the said second baffle is secured to the first baffle by spaced struts.

3. The invention as recited in claim 1, wherein the said second baffle is positioned above the inlet opening of the material-receiving member.

4. The invention as recited in claim 1, wherein the said second baffle has a diameter larger than that of the central opening in the said first baffle.

5. Apparatus for promoting the flow of material from a bin having a bottom opening, said apparatus comprising,
   a. a concave member terminating in a central opening,
   b. a pair of axially-spaced, inverted conical baffles carried by the concave member, one of the baffles having a central opening formed therein, and the other baffle being of a smaller diameter and supported by the first baffle by means forming passageways communicating with said opening, and
   c. vibrator means carried by said concave member.

* * * * *